Jan. 3, 1933.  G. B. BURNHAM  1,892,760
APPARATUS FOR OBTAINING SODIUM CHLORIDE
Filed Sept. 5, 1928
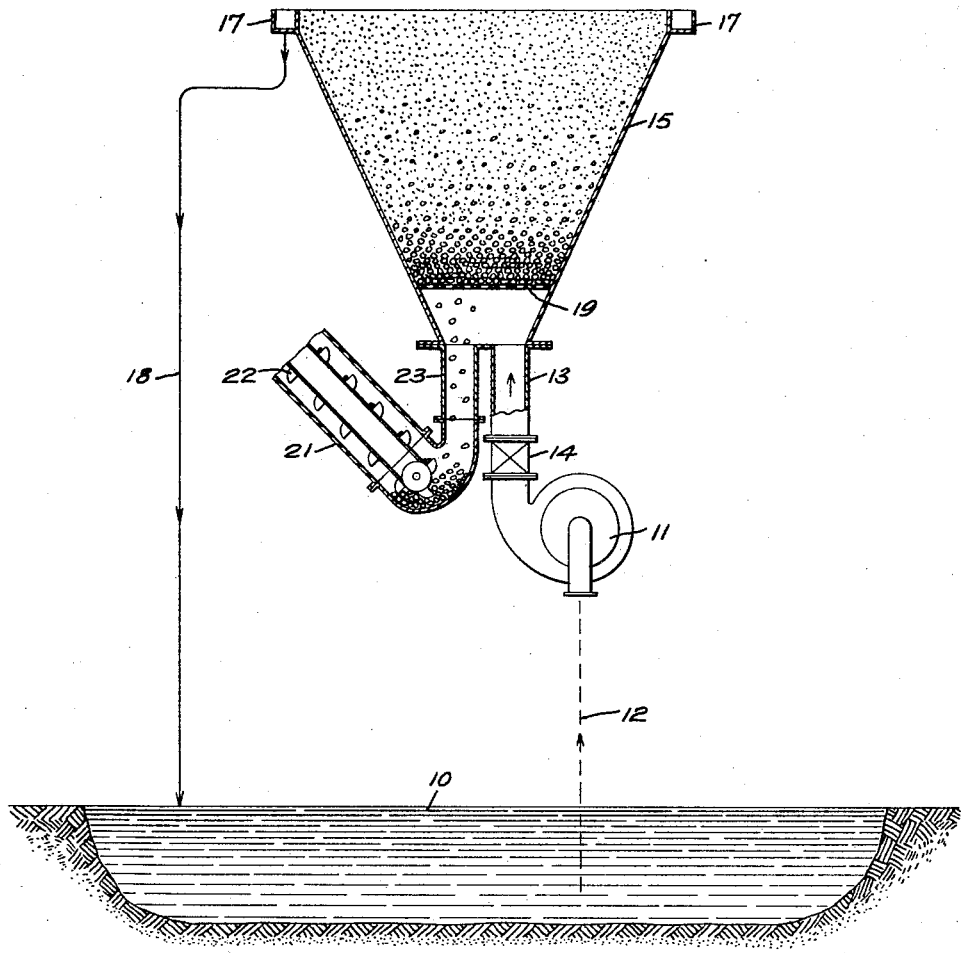
INVENTOR:
George B. Burnham
BY
White, Prost & Fryer
ATTORNEYS Patented Jan. 3, 1933

1,892,760

UNITED STATES PATENT OFFICE

GEORGE B. BURNHAM, OF RENO, NEVADA

APPARATUS FOR OBTAINING SODIUM CHLORIDE

Application filed September 5, 1928. Serial No. 304,119.

My invention relates to apparatus which may expediently be used in carrying out a process for obtaining a salt such as crystalline sodium chloride from saline liquor containing the same. Such a process is disclosed in my co-pending application entitled "Process of obtaining sodium chloride," Serial No. 69,275, now Patent No. 1,701,295, dated Feb. 5, 1929.

An object of my invention is to provide apparatus in which salt crystals above a certain size only will be collected.

An additional object of my invention is to provide apparatus in which a diminishing upward velocity is imparted to a saline liquor precipitating salt.

The foregoing and other objects are attained in the embodiment of the invention shown in the drawing, in which—

Fig. 1 is a diagrammatic representation of my apparatus, the crystallizing tank and associated parts and the evaporating pond being shown in the transverse section, and the direction of flow of the saline liquor being indicated by lines provided with arrow heads.

In its preferred form, the apparatus of my invention comprises a tank of varying cross-section thru which fluid is adapted to flow with correspondingly varying velocity, the tank having an inlet for fluid from an initial container, and having a collecting pocket disposed to receive material gravitally separated from the fluid.

I shall describe the apparatus as it is employed in connection with my process for obtaining sodium chloride from the subterranean brine found at Searles Lake, California, but the apparatus is advantageously employed in other processes and environments as well.

The subterranean Searles Lake brine is pumped into an initial container such as a large pond 10 to evaporate in the sun and wind. One pond can be used to operate the process, or a plurality of ponds may be used. In the latter case, as the brine evaporates and becomes more and more concentrated, it is allowed to flow by gravity from one pond to another.

In order that most of the crystallization shall not occur in the evaporating pond, but shall take place in a container from which the sodium chloride can easily be removed, the brine is caused to flow by suitable means thru a mass of sodium chloride crystals held in a suitable container. The pump 11 takes the brine from the pond thru a pipe represented by the dotted line 12 and discharges it thru an inlet conduit 13 provided with a regulating valve 14, into a crystallizing tank 15. The tank 15 is made with upwardly flaring walls and may conveniently be made of circular horizontal section, so that it is approximately conical. The upward velocity of the brine entering thru the inlet conduit 13 is gradually lessened as the liquid approaches the top of the tank. The actual velocity may be regulated by adjusting the valve 14 to regulate the quantity of liquid pumped. At the top of the crystallizing tank, an overflow launder 17 is provided and may be extended entirely around the periphery of the tank. Liquid overflowing the tank 15 is caught in the overflow launder and returned to the pond 10 by means of a pipe represented by the line 18.

A short distance above the bottom of the crystallizing tank, a perforated partition 19 is mounted. The partition is preferably horizontally disposed and serves by means of its perforations, to distribute the incoming fluid in the tank. The mass of sodium chloride crystals used to initiate the crystallization of that salt from the brine is disposed above the perforated partition. The brine entering thru the inlet conduit 13 and passing upwardly thru the perforations in the partition 19 comes into intimate contact with the sodium chloride crystals and crystallizes out the sodium chloride it contains, depositing the newly formed crystals upon the crystals previously in the tank, causing them to grow larger and drop gravitally thru the brine.

The crystals drop to the bottom of the tank and fall thru the perforations in the partition, when they have grown large enough to overcome the rather high velocity of the liquid flowing thru the perforations. It will be appreciated that by placing partitions with different size holes in the crystallizing tank, I can easily control the dimensions of the crystals which pass therethru. It will also be apparent that by varying the size of the holes in the partition 19, and by regulating the valve 14, I can control to a nicety the size of the crystals passing below the partition. This perforated partition also has the advantage of preventing eddy currents in the tank which are apt to be caused by the large jets of brine from the intake conduit. The numerous openings in the partition cause the brine stream to be broken up into many small streams and there are consequently fewer eddy currents. If the slope of the sides of the cone are relatively steep, the partition may be omitted, allowing the brine to flow upward with gradually decreasing velocity, without causing eddy currents. At the top of the tank the brine is relatively quiet and overflows as a practically clear liquor. A plurality of partitions may be used if desired.

The brine which overflows from the launder of the tank is returned to the solar pond to evaporate and again becomes supersaturated with sodium chloride and the process is repeated so that the entire volume of brine in the pond may be circulated once or even several times during a day thru the cone-shaped crystallizing tank. In this way, a large part of the sodium chloride crystallizing from the brine is formed in the tank where it can readily be recovered.

As shown in the drawing, the crystallizing tank 15 is provided in its bottom with a second opening 23. This opening is a collecting conduit or pocket and is preferably arranged adjacent to and parallel with the inlet conduit 13. The collecting conduit communicates with a chamber 21 which houses a bucket conveyor 22, or other suitable elevating mechanism. The chamber 21 receives the large crystals that fall thru the partition 19, since there is no upward current in conduit 23 as there is in conduit 13. The crystals collecting in the chamber 21 are of uniform size and are carried by the conveyor 22 into suitable storage bins, not shown, above the crystallizing tank.

It is to be understood that I do not limit myself to the form of the apparatus for obtaining sodium chloride shown and described herein, as the invention, as set forth in the following claims may be embodied in a plurality of forms.

I claim:

1. In an apparatus for recovering salts from brine, a crystallizing tank, an inlet conduit arranged in the bottom of said tank for passing an inlet stream of brine into the tank, and a hydraulically closed collecting chamber arranged in the bottom of said tank and adjacent the inlet conduit for collecting substantially all the salt crystallized from the brine and falling against the inlet stream of brine.

2. In an apparatus for recovering salts from brine, a crystallizing tank having upwardly flaring sides, a perforated partition disposed transversely in said tank, an overflow launder disposed around the upper periphery of said tank, a pump, an inlet conduit communicating with said pump and the bottom of said tank, a container, a conveyor in said container, and a collecting conduit connecting said container to the bottom of said tank and being disposed adjacent said inlet conduit.

3. In an apparatus for recovering salts from brine comprising brine supply means, a crystallizing tank for receiving brine from said supply means and for passing said brine upwardly along one side of the tank in a stream of increasing area and decreasing velocity whereby crystals formed in the brine become suspended in the stream substantially according to their specific gravity, and hydraulically closed means positioned on the opposite side of the tank from the brine inlet for collecting crystals from said tank having a specific gravity such that they pass out of suspension in a quiescent area in the flowing brine away from the brine inlet.

4. In a crystallizing apparatus, a crystallizing vessel, an inlet connection to the vessel, means for delivering a brine for treatment to the inlet connection including a delivery pipe, a perforated plate positioned over the inlet connection and in the lower portion of the vessel so as to distribute flow from the inlet connection, and a hydraulically closed outlet connection, said outlet connection being in communication with the vessel beneath the perforated plate so that crystals formed in the vessel and passing through the perforations in the plate are collected.

5. In a crystallizing apparatus, a crystallizing vessel having sides flaring upwardly to an open top, an inlet connection to the vessel, means for delivering a brine for treatment to the inlet connection including a delivery pipe, a perforated plate positioned over the inlet connection and in the lower portion of the vessel so as to distribute flow from the inlet connection, and a hydraulically closed outlet connection, said outlet connection being in communication with the vessel beneath the perforated plate so that crystals formed in the vessel and passing through the perforations in the plate are collected.

6. In a crystallizing apparatus, a crystallizing vessel, a wall extended across the vessel to divide the vessel into a crystallizing portion and a brine portion, the wall including a plurality of passages therethrough from one portion to the other, means for delivering brine to the brine portion, and a hydraulically closed crystal collecting means communicating with said brine portion for receiving substantially all crystals formed in the crystallizing portion.

7. In an apparatus for recovering salts from brine, a crystallizing tank having upwardly flaring sides, a perforated partition disposed transversely in said tank, a pump, an inlet conduit communicating with said pump and the bottom of said tank, a container, a conveyor in said container, an otherwise closed collecting conduit connecting said container to the bottom of said tank and opening thereinto adjacent said inlet conduit, and means for controlling flow of brine into the tank to control the size of crystals collected in said container.

In testimony whereof, I have hereunto set my hand.

GEORGE B. BURNHAM.